(12) United States Patent
Saito et al.

(10) Patent No.: US 7,711,664 B2
(45) Date of Patent: May 4, 2010

(54) PREDICTING CRACK PROPAGATION IN THE SHAFT DOVETAIL OF A GENERATOR ROTOR

(75) Inventors: Kazuhiro Saito, Yokohama (JP); Yomei Yoshioka, Yokohama (JP); Koji Matsuyama, Yokohama (JP); Hiromichi Ito, Tokyo (JP); Ryoji Nagano, Yokohama (JP); Hiroaki Koinuma, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 590 days.

(21) Appl. No.: 11/645,674

(22) Filed: Dec. 27, 2006

(65) Prior Publication Data

US 2007/0172357 A1  Jul. 26, 2007

(30) Foreign Application Priority Data

Dec. 28, 2005 (JP) ............................. 2005-380253

(51) Int. Cl.
 *G06E 1/00* (2006.01)
 *G06E 3/00* (2006.01)
(52) U.S. Cl. .............................. 706/21; 702/34; 702/35; 416/97 R
(58) Field of Classification Search .................. 29/598; 416/97 R; 340/679; 310/270; 702/34, 35
See application file for complete search history.

(56) References Cited

U.S. PATENT DOCUMENTS

| | | | | |
|---|---|---|---|---|
| 4,408,294 A | * | 10/1983 | Imam | 702/35 |
| 4,875,170 A | * | 10/1989 | Sakurai et al. | 702/34 |
| 5,174,011 A | * | 12/1992 | Weigelt | 29/598 |
| 5,902,093 A | * | 5/1999 | Liotta et al. | 416/97 R |
| 6,250,166 B1 | * | 6/2001 | Dingwell et al. | 73/810 |
| 6,398,499 B1 | * | 6/2002 | Simonetti et al. | 416/193 A |
| 6,756,908 B2 | * | 6/2004 | Gass et al. | 340/679 |
| 6,849,972 B1 | | 2/2005 | Barnes et al. | |
| 6,930,434 B1 | * | 8/2005 | Spencer et al. | 310/270 |
| 7,162,373 B1 | * | 1/2007 | Kadioglu et al. | 702/35 |

FOREIGN PATENT DOCUMENTS

| | | |
|---|---|---|
| JP | 59-213249 | 12/1984 |
| JP | 4-29304 | 1/1992 |
| JP | 06-197485 | 7/1994 |
| JP | 6-197485 | 7/1994 |

\* cited by examiner

*Primary Examiner*—David R Vincent
*Assistant Examiner*—Ola Olude-Afolabi
(74) *Attorney, Agent, or Firm*—Finnegan, Henderson, Farabow, Garrett & Dunner, L.L.P.

(57) ABSTRACT

An object of the present invention is to control crack propagation, either by predicting shaft dovetail crack propagation with high accuracy, or by determining operation conditions under which the crack does not extend. The crack propagation prediction system includes an operation processing unit, an interface unit, and a memory unit. The operation processing unit includes a stress calculation unit that calculates the mean stress generated in the shaft dovetail, a factor range calculation unit that calculates the stress intensity factor range for the crack in the shaft dovetail, and a crack propagation amount calculation unit that calculates an amount of the shaft dovetail crack propagation for an arbitrary time period, from the obtained mean stress and the stress intensity factor range, an operation pattern, an operation time, and data on the crack. The stress calculation unit includes as individual calculation units that calculate separately different types of mean stress, a contact surface pressure stress calculation unit, a thermal stress calculation unit, and a residual stress calculation unit, as well as a mean stress calculation unit that sums these mean stresses.

7 Claims, 11 Drawing Sheets

PREDICTING CRACK PROPAGATION IN THE SHAFT DOVETAIL OF A GENERATOR ROTOR

BACKGROUND OF THE INVENTION

1. Field of the Invention

The present invention relates to technology for predicting crack propagation in the rotors of generators used in energy plant, determining the operation conditions, and controlling operation.

2. Description of the Related Art

In the rotors of generators used in energy plant, slots are cut in the axial direction, and coils are inserted into the slots. To prevent the coils from being forced out by centrifugal force, dovetails are provided in the outer periphery of the shaft, into which wedges are inserted.

In generator rotors having this type of fitted structure, as a result of centrifugal forces during operation the wedges are forced against the dovetails of the shaft, and at the same time the rotor is subject to repeated bending due to its self-weight. At the ends of the areas of contact between the shaft dovetails and wedges repeated minute relative slippage, or the phenomenon known as fretting, occurs. If damage due to fretting is severe, it can lead to fatigue, so methods have been proposed to prevent the occurrence of fretting fatigue cracking where the wedges contact the shaft of the generator.

For example, in Japanese Patent Publication No. H4-29304 stress relieving grooves are provided in the contact areas of the shaft corresponding to the joints with the wedges to reduce the contact line stresses in the contact end areas. Also, in for example Japanese Patent Application Laid-open No. H6-197485, by reducing the hardness at the end portions and changing the shape of the wedges, the surface pressure concentration in the contact end areas is relieved. By these measures, if the stresses are reduced in the cover end portions, the potential for occurrence of fretting fatigue cracking can be reduced.

On the other hand, the measures taken are not sufficient, so there have been cases where the occurrence of cracking has been discovered by inspection in the contact area between the shaft dovetail and the wedges. In rotating machinery, fatigue cracks do not remain stationary, but rapidly extend due to the high cycle fatigue accompanying rotation. Therefore the defect in the rotating body is chipped and removed as a rule, regardless of the position of occurrence, shape, or dimension.

For fretting fatigue cracks in the shaft dovetails of generator rotors also, defects discovered during periodic inspection are chipped and removed, similar to other rotating bodies. However, the cracks discovered during periodic maintenance are mostly short cracks near the surface. Also cases where this cracking has ultimately led to the failure of the rotor are rare. Therefore, it is considered that the cracks do not necessarily quickly extend.

In the phenomenon of fretting fatigue cracking of shaft dovetails, high contact line stresses caused by friction forces are concentrated in a very narrow part of the contact end surface. Proceeding to the interior of the surface the stresses rapidly reduce. Also, the mean stress that is acting is compressive, due to the high contact surface pressure, so it is known that the cracks can easily remain stationary.

Also, the mechanism of occurrence of fretting fatigue in shaft dovetails is understood to be as follows, Repeated relative slippage with the wedges is caused by bending of the rotor due to the self-weight of the rotor. This causes repeated friction forces to be generated, which generates a repeated stress amplitude in the surface layer. In the case of this generation mechanism, if the same type of machinery is properly assembled, there should be no difference in the value of repeated stress amplitude caused by friction or the value of shaft dovetail compressive mean stress due to the surface pressure of the wedge pressing against the shaft.

However, the size of cracks actually discovered in the shaft dovetails of generator rotors varies. Even in the same type of machine the same crack size is not necessarily found, so the mechanism of generation of fretting fatigue described above is not sufficient to explain the actually observed phenomena.

Therefore, as it is not possible to quantitatively explain the mechanism of fretting fatigue cracking in shaft dovetails at present, it is not possible to determine whether a fretting fatigue crack in the shaft dovetail of a generator rotor is stationary or not. Therefore, defects that are discovered are chipped and removed. It is also possible to make a design change that changes the mechanical state of the contact area. However, for this it is necessary to temporarily remove the wedge from the dovetail, so there are more operations than chipping and removing the crack.

SUMMARY OF THE INVENTION

If it was possible to determine how much a fretting fatigue crack in the shaft dovetail of a generator rotor would extend by the next periodic inspection, it would be possible to take measures corresponding to the position, shape, and size of a crack discovered during periodic inspection. This would improve the operating efficiency of the generator, and increase the reliability of the equipment.

However, for fretting fatigue of the shaft dovetails of a generator rotor, it is difficult to determine whether a crack extends or not, as explained above. Therefore there is no effective method of controlling the crack propagation without changing the shape of the contact area or the rotor, and so on. This has resulted in the task of determining measures to be taken in respect of cracks discovered during periodic inspection.

The present invention was proposed to solve the problems of conventional technology as described above. The object of the present invention is to provide a generator rotor crack propagation prediction system and operation conditions determination support system, method, and program, and operation control system through which crack propagation can be controlled, either by predicting with high accuracy the crack propagation of shaft dovetails, or by determining the operating conditions under which cracks does not extend.

In order to achieve this object, the present invention can predict with high accuracy the shaft dovetail crack propagation or determine the operation conditions under which crack propagation does not occur, by calculating the stress intensity factor range for a crack that has been generated in the shaft dovetail, and using the stress intensity factor range and the mean stress in the shaft dovetail, and calculating the amount of shaft dovetail crack propagation or an operation limiting value for which crack propagation does not occur.

The generator rotor crack propagation prediction system according to the present invention includes memory means, interface means, stress calculation means, factor range calculation means, and crack propagation amount calculation means. Here, the interface means is means for inputting data and outputting results. The stress calculation means is means for calculating the mean stress in the generator rotor shaft dovetail and storing the mean stress in the memory means. The factor range calculation means is means for calculating the stress intensity factor range for a crack that has been generated in the shaft dovetail, and storing the stress intensity factor range in the memory means. The crack propagation amount calculation means is means for calculating an amount the shaft dovetail crack propagation from the mean stress and stress intensity factor range stored in the memory means and crack data.

The generator rotor operation conditions determination system includes memory means, interface means, factor range calculation means, operation limiting value calculation means, and operation pattern determination means. Here, the interface means is means for inputting data and outputting results. The factor range calculation means is means for calculating the stress intensity factor range for a crack that has been generated in the shaft dovetail based on the size, position, and shape of the crack that has been generated in the shaft dovetail, and storing the stress intensity factor range in the memory means. The operation limiting value calculation means is means for calculating as an operation limiting value that determines the operation conditions the mean stress at which the crack does not extend corresponding to the stress intensity factor ranges stored in the memory means, based on data for the material lower bound stress intensity factor range, and storing the mean stress in the memory means. The operation pattern determination means is means for determining the operation pattern at which the crack does not extend using mean stress data created from various types of operation pattern, based on the operation limiting value stored in the memory means.

The generator rotor crack propagation prediction method and operation conditions determination support method, and program according to the present invention reflects the characteristics of the system described above, from the viewpoints of methods or computer programs respectively. Also, the generator rotor operation control system according to the present invention is technology that uses the operation conditions determination support system to control the operation of a generator rotor.

The present invention as described above was obtained as a result of the inventors investigating the mean stresses acting on the shaft dovetail during operation, in particular the thermal stresses when stopping, and determining the mechanism as the stress conditions necessary so that the crack does not extend. In other words, even with the same type of plant, different types of cracks can be generated as a result of differences in the operating patterns at each power generating station. Also, a stress evaluation method has been established based on the mechanism that crack propagation is dominated by fluctuations in the mean stress in the shaft dovetail during operation. Therefore, it is possible to control crack propagation by operation control, without changing the shape of the contact area or the rotor.

According to the present invention, it is possible to either predict shaft dovetail crack propagation with high accuracy, or determine operation conditions under which the crack does not extend. Therefore, it is possible to provide a generator rotor crack propagation prediction system and operation conditions determination support system, method, and program, and an operation control system that is capable of controlling crack propagation.

DESCRIPTION OF THE PREFERRED EMBODIMENTS

The following is a detailed explanation of several embodiments that apply the present invention, with reference to the drawings.

First Embodiment

[Configuration]

Figure 1:
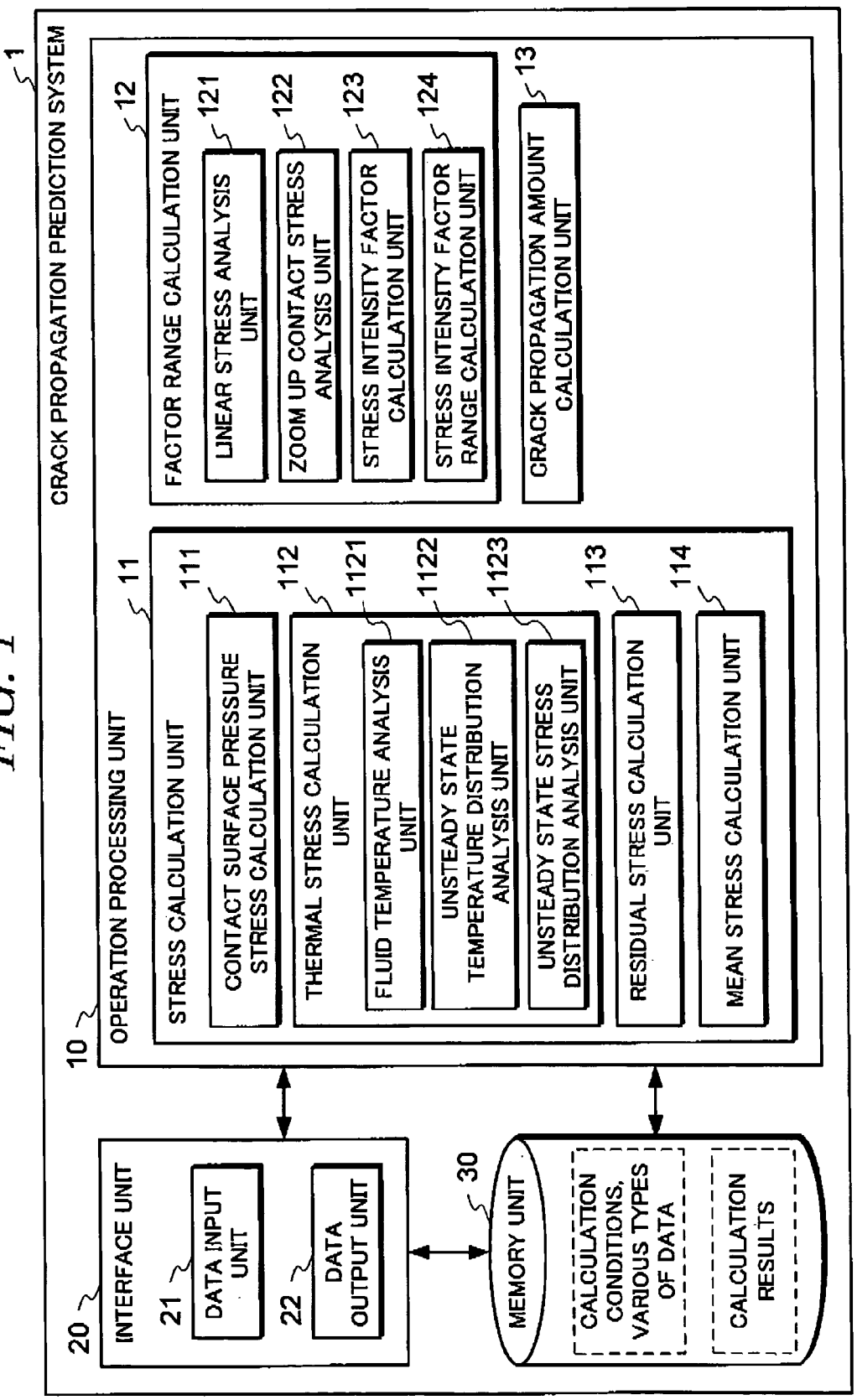
FIG. 1 is a block diagram showing a generator rotor crack propagation prediction system according to a first embodiment that applies the present invention.

FIG. 1 is a block diagram showing a generator rotor crack propagation prediction system according to a first embodiment that applies the present invention. As shown in FIG. 1, the crack propagation prediction system 1 includes an operation processing unit 10, an interface unit 20, a memory unit 30, and so on. Each part of the crack propagation prediction system 1 is described in detail below.

The interface unit 20 includes a data input unit 21, and a data output unit 22. Here, the data input device 21 is an input device such as a mouse or keyboard that inputs signals to a computer in accordance with the operations of the operator. The data output unit 22 is an output device such as a display or a printer that displays or outputs to the operator data input by the data input unit 21 or process results processed within the system.

The operation processing unit 10 includes a stress calculation unit 11 that calculates the mean stress generated in the shaft dovetail, a factor range calculation unit 12 that calculates the stress intensity factor range for cracks generated in the shaft dovetail, and a crack propagation amount calculation unit 13 that calculates an amount of the shaft dovetail crack propagation over an arbitrary time from the mean stress and stress intensity factor range obtained, the operating pattern, operating time, and data regarding the crack.

The stress calculation unit 11 includes a contact surface pressure stress calculation unit 111, a thermal stress calculation unit 112, and a residual stress calculation unit 113, as separate calculation units that calculate separately different types of mean stress, and a mean stress calculation unit 114 that adds the mean stresses. Here, the contact surface pressure stress calculation unit 111 is the part that calculates the mean stress generated in the shaft dovetail by the contact surface pressure between the shaft dovetail and wedge. The thermal stress calculation unit 112 is the part that calculates the mean stress generated in the shaft dovetail by the shaft dovetail thermal stresses. The residual stress calculation unit 113 is the part that calculates the mean stress generated in the shaft dovetail by the residual stresses. The mean stress calculation unit 114 calculates the mean stress in the shaft dovetail by summing the mean stresses obtained by the individual calculation units 111 through 113.

Also, the thermal stress calculation unit 112 includes a fluid temperature analysis unit 1121, an unsteady state temperature distribution analysis unit 1122, and an unsteady state contact stress analysis unit 1123 as step-by-step analysis units. Here, the fluid temperature analysis unit 1121 is a part that carries out fluid temperature analysis of the cooling medium near the generator rotor and the generator coils. The unsteady state temperature distribution analysis unit 1122 is a part that carries out unsteady temperature distribution analysis of the wedges and rotor, using the cooling medium heat transfer coefficients and temperature data obtained from the fluid temperature analysis as temperature boundary conditions. The unsteady state contact stress analysis unit 1123 is a part that carries out unsteady contact stress analysis of the rotor and wedges, using the temperature distribution obtained from the unsteady state temperature distribution analysis.

The factor range calculation unit 12 includes a linear stress analysis unit 121, a zoom up contact stress analysis unit 122, a stress intensity factor calculation unit 123, and a stress intensity factor range calculation unit 124. Here, the linear stress analysis unit 121 is a part that carries out linear stress analysis of an entire generator rotor model. The zoom up contact stress analysis unit 122 is a part that carries out shaft dovetail zoom up contact stress analysis using deformation and stress data of part of the rotor obtained from the linear stress analysis. The stress intensity factor calculation unit 123 is a part that calculates the stress intensity factor for shaft dovetail cracks using the stress distribution or displacement distribution obtained from the zoom up contact stress analysis. The stress intensity factor range calculation unit 124 is a part that calculates the stress intensity factor range using the stress intensity factor.

This type of operation processing unit 10 can be realized through a combination of a computer main memory, a program stored in the main memory that is dedicated to the prediction of crack propagation, a CPU that is controlled by the program, and so on.

The memory unit 30 is a part that stores calculation conditions and various data for use in calculations by the operation processing unit 10, as well as storing calculation results obtained by the operation processing unit 10. This type of memory unit 30 can be realized by the memory of a computer or an auxiliary memory device.

[Operation]

Figure 2:
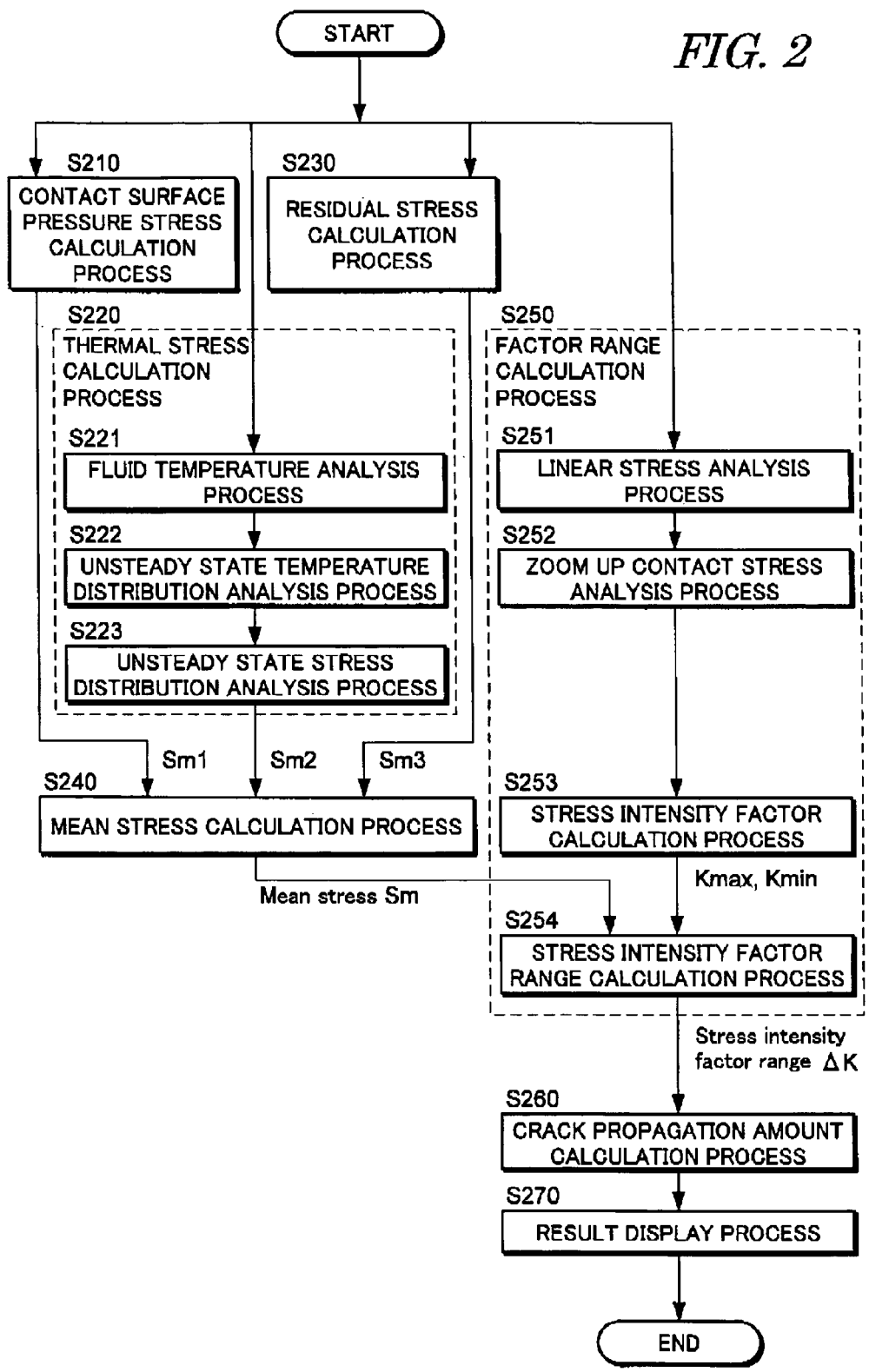
FIG. 2 is a flowchart showing the operation outline of the generator rotor crack propagation prediction system according to the first embodiment that applies the present invention.

FIG. 2 is a flowchart showing the operation outline of the crack propagation prediction system 1 according to the first embodiment as described above.

As shown in FIG. 2, the crack propagation prediction system 1 first calculates the mean stress due to the contact surface pressure with the wedge Sm1, the mean stress due to thermal stresses Sm2, and the mean stress due to residual stresses Sm3 by carrying out a contact surface pressure stress calculation process (S210), a thermal stress calculation process (S220), and a residual stress calculation process (S230) by the contact surface pressure stress calculation unit 111, the thermal stress calculation unit 112, and the residual stress calculation unit 113 of the stress calculation unit 11, either in parallel or in a predetermined order.

In the thermal stress calculation process (S220) by the thermal stress calculation unit 112, the mean stress due to the thermal stresses Sm2 is calculated by carrying out a fluid temperature analysis process (S221), an unsteady state temperature distribution analysis process (S222), and an unsteady state stress distribution analysis process (S223) by the fluid temperature analysis unit 1121, the unsteady state temperature distribution analysis unit 1122, and the unsteady state contact stress analysis unit 1123 of the thermal stress calculation unit 112 in this order and in a step-by-step manner.

Then, when the mean stress due to the contact surface pressure with the wedge Sm1, the mean stress due to thermal stresses Sm2, and the mean stress due to residual stresses Sm3 have been calculated by the above processes (S210, S220, S230) respectively, the mean stress Sm3 in the shaft dovetail is calculated by a mean stress calculation process (S240) by the mean stress calculation unit 114 of the stress calculation unit 11 by adding the mean stresses Sm1 through Sm3, and the mean stress Sm is stored in the memory unit 30.

On the other hand, the crack propagation prediction system 1 starts a factor range calculation process (S250) by the factor range calculation unit 12. In the factor range calculation process (S250), the stress intensity factor range $\Delta K$ is calculated by a linear stress analysis process (S251), a zoom up contact stress analysis procedure (S252), a stress intensity factor calculation process (S253), and a stress intensity factor range calculation process (S254) carried out by the linear stress analysis unit 121, the zoom up contact stress analysis unit 122, the stress intensity factor calculation unit 123, and the stress intensity factor range calculation unit 124 of the factor range calculation unit 12 in this order and step-by-step. In this case, in the stress intensity factor range calculation process (S254) the stress intensity factor range $\Delta K$ is calculated using the stress intensity factor K calculated in the previous step, the stress intensity factor calculation process (S253), and the mean stress Sm calculated in the mean stress calculation process (S240), and the stress intensity factor range $\Delta K$ is stored in the memory unit 30.

Finally, the crack propagation prediction system 1 calculates the shaft dovetail crack propagation amount for an arbitrary time period by a crack propagation amount calculation process (S260) carried out by the crack propagation amount calculation unit 13. The crack propagation amount calculation process (S260) uses the mean stress Sm and the stress intensity factor range $\Delta K$ obtained from previous processes (S240, S250) and data on operating patterns, operating times, and cracks that are input and stored in advance. The shaft dovetail crack propagation amount is stored in the memory unit 30. The crack propagation prediction system 1 also carries out a result display process (S270) by the data output unit 22 of the interface unit 20 to display the calculated result of the crack propagation amount.

[Crack Propagation Mechanism]

Figure 3:
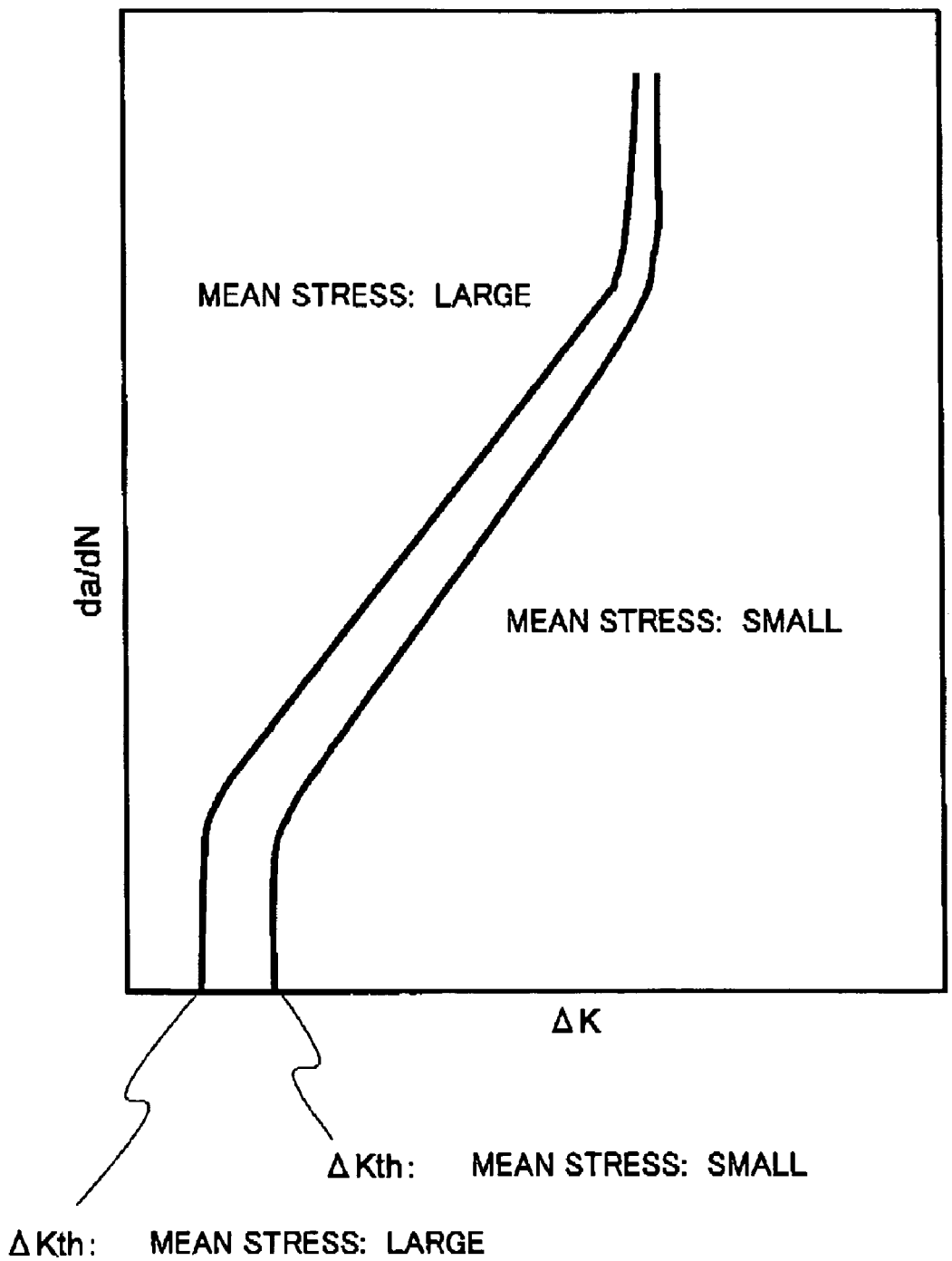
FIG. 3 is a diagram showing schematically a crack propagation curve for the rotor material for explaining the mechanism of crack propagation in the rotor material.

The configuration of the crack propagation prediction system 1 according to the first embodiment and the operation outline are based on the crack propagation mechanism discovered by the inventors. FIG. 3 is a diagram that schematically shows the crack propagation curve for rotor material, to explain this mechanism. In FIG. 3, the horizontal axis is the stress intensity factor range $\Delta K$, and the vertical axis is the crack propagation rate $da/dN$. In the figure, to express the effect that the mean stress has on the crack propagation rate, several curves are plotted.

As shown in FIG. 3, when the mean stress is high, the crack propagation rate is faster. Also, comparing the lower bound stress intensity factor range $\Delta K_{th}$ at which the crack is stationary, when the mean stress is high the lower bound stress intensity factor range $\Delta K_{th}$ becomes small, and even with a small stress amplitude the crack extends. In this way, in generator rotors, the same as for general high cycle fatigue phenomena, the effect of mean stress on crack propagation is large, and to evaluate crack propagation behavior it is important to accurately obtain the stress intensity factor range $\Delta K$ and the mean stress.

[Details of the Processes]

In the following the characteristic processes of the present invention in the operation of the crack propagation prediction system 1 according to the first embodiment shown in FIG. 2 are successively explained in detail, assuming the crack propagation mechanism as described above.

[Contact Surface Pressure Stress Calculation Process]

The compressive stress field around the crack due to the contact surface pressure is caused by the wedge being pressed against the shaft dovetail by centrifugal force. Therefore, in the contact surface pressure stress calculation process (S210) by the contact surface pressure stress calculation unit 111 of the stress calculation unit 11, the mean stress due to contact surface pressure can be obtained by solving the contact problem between the wedge and the shaft dovetail. This can be done using either simplified formulae that model the contact area or finite element analysis, or similar. Also, a database created by the numerical experimental method or similar may be used.

Figure 4:
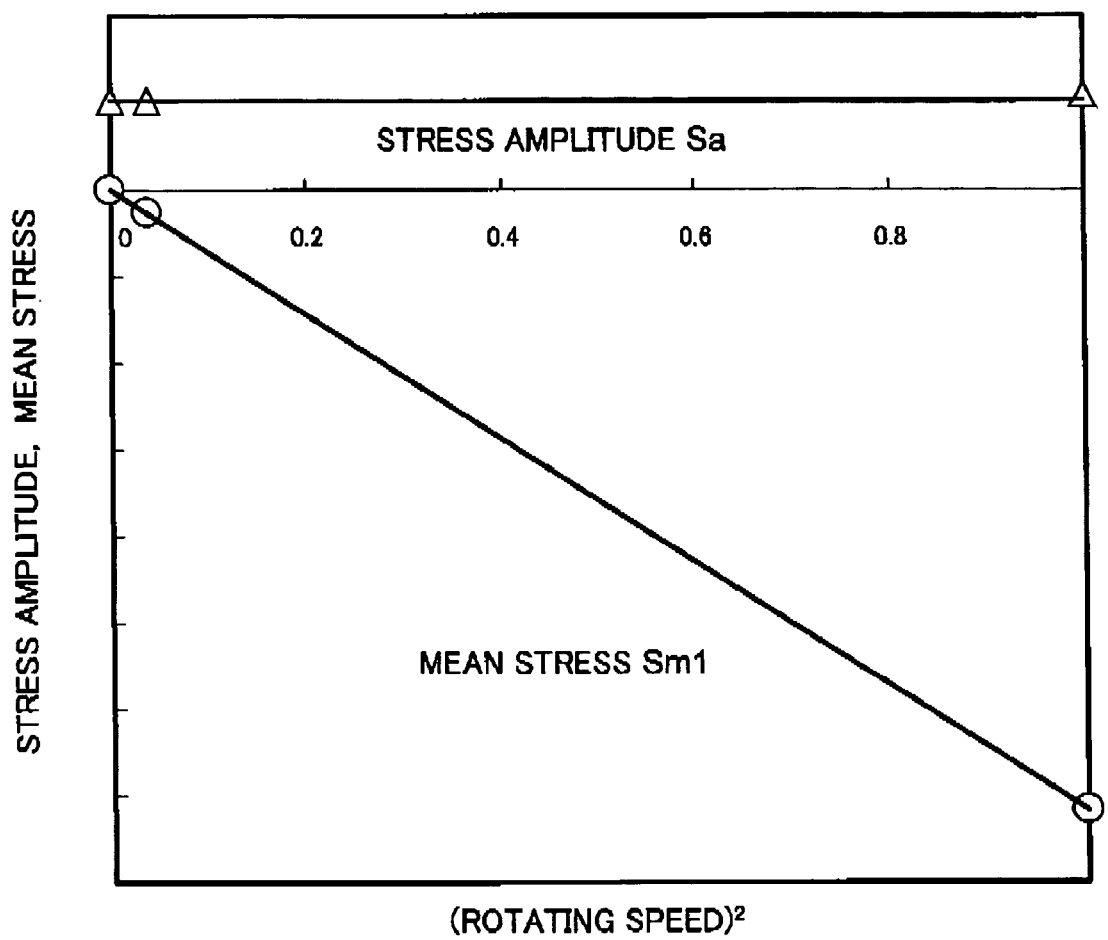
FIG. 4 is a diagram showing an example of the mean stress obtained by finite element analysis, as an example of the contact surface pressure stress calculation process by the contact surface pressure stress calculation unit according to the first embodiment.

FIG. 4 shows an example of the mean stress obtained by finite element analysis as an example of the contact surface pressure stress calculation process (S210) by the contact surface pressure stress calculation unit 111. At the contact area of the shaft dovetail the mean stress is a compressive stress that is proportional to the square of the rotating speed, in other words proportional to the centrifugal force. From this the mean stress Sm1 due to contact surface pressure may be calculated for an arbitrary operating condition by assuming the following Equation (1).

$$Sm1 = Sm1_0 \times (\omega/\omega_0)^2 \qquad \text{Equation (1)}$$

Where, $Sm1_0$ is the mean stress due to the surface pressure at the rated rotating speed, $\omega$ is the rotating speed, and $\omega_0$ is the rated rotating speed.

[Thermal Stress Calculation Process]

As shown in FIG. 2, the mean stress Sm2 due to thermal stresses is calculated by the thermal stress calculation process (S220) by the thermal stress calculation unit 112, by carrying out the fluid temperature analysis process (S221), the unsteady state temperature distribution analysis process (S222), and the unsteady state stress distribution analysis process (S223) by the fluid temperature analysis unit 1121, the unsteady state temperature distribution analysis unit 1122, and the unsteady state stress distribution analysis unit 1123 of the thermal stress calculation unit 112 by the thermal stress calculation unit 112.

In the fluid temperature analysis process (S221) by the fluid temperature analysis unit 1121, which is the first process of the thermal stress calculation process (S220), the flow of cooling fluid in the vicinity of the generator rotor and the generator coils is modeled, and finite element analysis is carried out. Specifically, from shape data for the rotor, coils, creepage blocks, wedges, insulators, air layers, and other elements, together with material property data, coil temperatures, coil field current, flow rates of the cooling fluid, inlet temperature, outlet temperature, rotating speed, and other operating conditions, it is possible to obtain the heat transfer coefficient between the cooling fluid and the coils or the rotor, the cooling fluid temperature, the rotor and coil temperature, and the coil heat generation.

In the unsteady state temperature distribution analysis process (S222) by the unsteady state temperature distribution analysis unit 1122, which is the second process in the thermal stress calculation process (S220), the temperature distribution of the rotor, coils, creepage blocks, and wedges are obtained as data to be used in the subsequent nonstationary stress distribution analysis process (S223). In the unsteady state temperature distribution analysis process (S222), unsteady temperature distribution analysis is carried out by the finite element method using shape data and material property data for the rotor, coils, creepage blocks, wedges, other elements, and coil heat generation rates, cooling fluid temperatures, heat transfer coefficients, and other thermal boundary conditions obtained from the fluid temperature analysis process (S221), to obtain the temperatures in the rotor, wedges, coils, creepage blocks, and so on.

If a common analysis model can be used for the fluid temperature analysis process (S221) and the unsteady state temperature distribution analysis process (S222), then they may be carried out as a single finite element analysis. In this case, the fluid temperature analysis unit 1121 and the unsteady state temperature distribution analysis unit 1122 may be integrated to form a single analysis unit.

In the unsteady state stress distribution analysis process (S223) by the unsteady state stress distribution analysis unit 1123, which is the third process of the thermal stress calculation process (S220), stress analysis is carried out by the finite element method using the temperature distributions obtained in the unsteady state temperature distribution analysis process (S222) in the previous step, to obtain the stress distribution in the rotor, coils, creepage blocks, and so on. The thermal stresses generated in the shaft dovetail include thermal stresses caused by the temperature distribution in the overall shaft, and thermal stresses caused by the specific properties of the area of contact between the shaft dovetail and the wedges. Therefore, in the unsteady state stress distribution analysis process (S223), it is necessary to model the contact between the shaft dovetails and the wedges.

Figure 5:
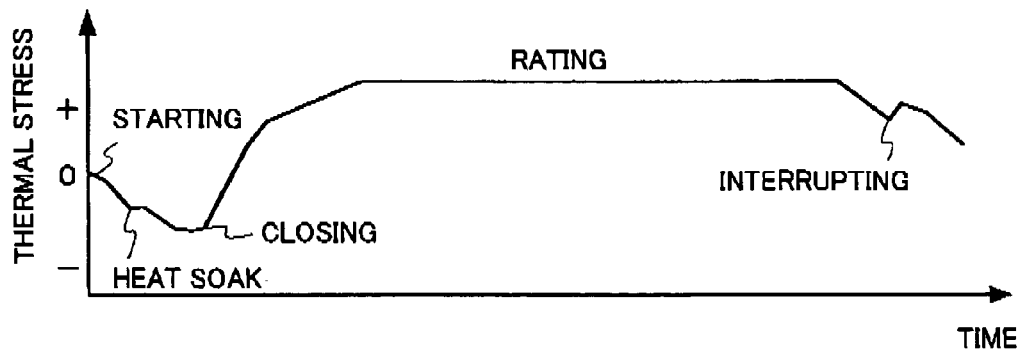
FIG. 5 is a diagram showing how the thermal stress in the shaft dovetail varies with time during operation.

Then, using the stress distribution data obtained in the unsteady state stress distribution analysis process (S223), it is possible to display how the thermal stress of the shaft dovetail that is used for evaluating the fatigue crack propagation varies with time during operation, as shown in FIG. 5.

[Residual Stress Calculation Process]

Unlike the stresses due to surface pressure and thermal stresses, the residual stresses are generated during rotor steelmaking, slot and shaft dovetail processing, and heat treatment, but do not vary during operation. Therefore, in the residual stress calculation process (S230) by the residual stress calculation unit 113, the residual stress Sm3 is obtained by inputting material, manufacturing period, SR and other heat treatment methods using a residual stress database prepared in advance.

[Mean Stress Calculation Process]

Figure 6:
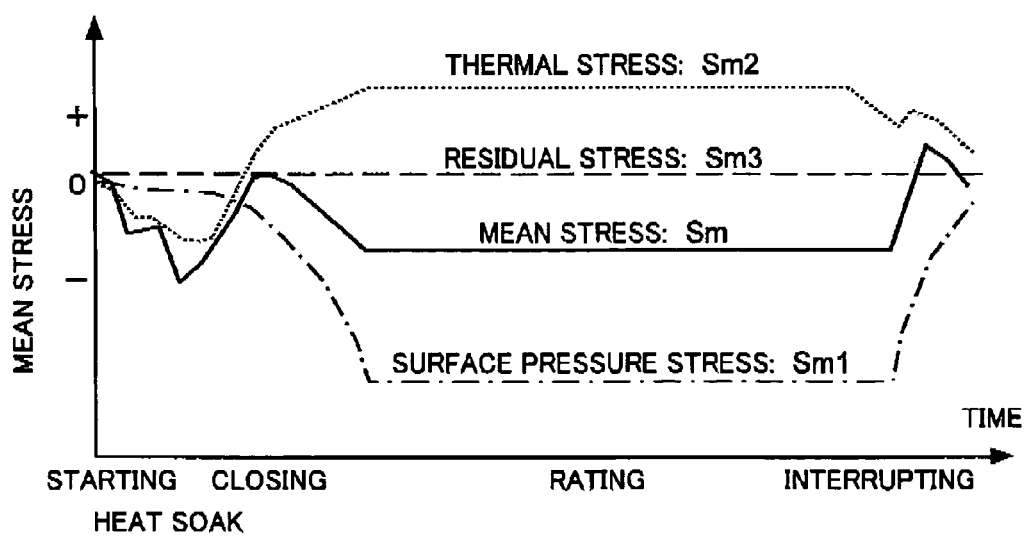
FIG. 6 is a diagram showing an example of the mean stress, by combining the stress due to pressure at the contact surface with the wedge, the shaft dovetail thermal stress, and the residual stress, calculated by the mean stress calculation process of the mean stress calculation unit in the first embodiment.

FIG. 6 shows an example of the mean stress Sm calculated by adding the stress Sm1 due to the contact surface pressure with the wedges, the shaft dovetail thermal stress Sm2, and the residual stress Sm3 in the mean stress calculation process (S240) by the mean stress calculation unit 114. In this example, when the rotating speed is close to the rated rotating speed, at which the compressive stress due to the contact surface pressure is large compared with the thermal stress Sm2, the mean stress Sm is compressive. The residual stress Sm3 is small compared with the other stresses, and has only a minor effect on the mean stress Sm. The thermal stress Sm2 is compressive during start up, so it can be seen that the maximum value of the mean stress Sm on the tension side is immediately after interrupting the field current during the stopping operation.

[Factor Range Calculation Process]

As shown in FIG. 2, in the factor range calculation process (S250) by the factor range calculation unit 12, the stress intensity factor range $\Delta K$ is calculated by carrying out the linear stress analysis process (S251), the zoom up contact stress analysis procedure (S252), the stress intensity factor calculation process (S253), and the stress intensity factor range calculation process (S254) carried out by the linear stress analysis unit 121, the zoom up contact stress analysis unit 122, the stress intensity factor calculation unit 123, and the stress intensity factor range calculation unit 124 of the factor range calculation unit 12 in this order and step-by-step.

Here, in the linear stress analysis process (S251) by the linear stress analysis unit 121, the repetitive strain and stress amplitudes generated in the shaft dovetail is obtained from linear finite element analysis of rotor bending due to rotation, from the rotor shape, dimensions, and material data, the slot internal structure shape, dimensions, and material data, and the wedge shape, dimensions, and material data.

When the repetitive strain and stress amplitudes generated in the shaft dovetail is obtained from the linear stress analysis process (S251), zoom up finite element analysis is carried out as the zoom up contact stress analysis procedure (S252) by the zoom up contact stress analysis unit 122 to obtain the detailed stress and displacement around the shaft dovetail crack. This zoom up finite element analysis takes into account the effect of contact between the shaft dovetail and wedges, so the contact is analyzed.

In the stress intensity factor calculation process (S253) by the stress intensity factor calculation unit 123, the maximum stress intensity factor Kmax and the minimum stress intensity factor Kmin at the crack tip are obtained as the crack stress intensity factor K, by determining the shaft dovetail crack position, shape, and dimensions based on crack data obtained from inspection or similar. Here, the displacement method using zoom up analysis of the modeled cracked portion is suitable as the method of calculating the stress intensity factors, but the influence function method or another simplified method may also be used.

In the stress intensity factor range calculation process (S254) by the stress intensity factor range calculation unit 124, the value of Kmax minus Kmin is obtained as the stress intensity factor range $\Delta K$. However, if the mean stress Sm obtained in the mean stress calculation process (S240) is compressive and the minimum stress intensity factor Kmin is negative, the minimum stress intensity factor Kmin is taken to be zero, to take account of crack mouth closing, and the stress intensity factor range $\Delta K$ is calculated.

[Effect]

According to the first embodiment as described above, the mean stress in the shaft dovetail, which affects the extension of cracks in the shaft dovetail, can be accurately determined. Therefore it is possible to quantitatively calculate how much a shaft dovetail crack discovered during a periodic inspection or similar extends by the next periodic inspection, using the operating patterns and period as calculation conditions. Also, a stress evaluation method can be established based on the mechanism that crack propagation is dominated by the changes in mean stress in the shaft dovetail during operation. Therefore, it is possible to control crack propagation by operation control, without changing the shape of the contact area or the rotor, or the like.

Therefore, it is possible to predict with high accuracy shaft dovetail crack propagation, and it is possible to provide a generator rotor crack propagation prediction system, method, and program capable of controlling crack propagation.

Second Embodiment

[Configuration]

Figure 7:
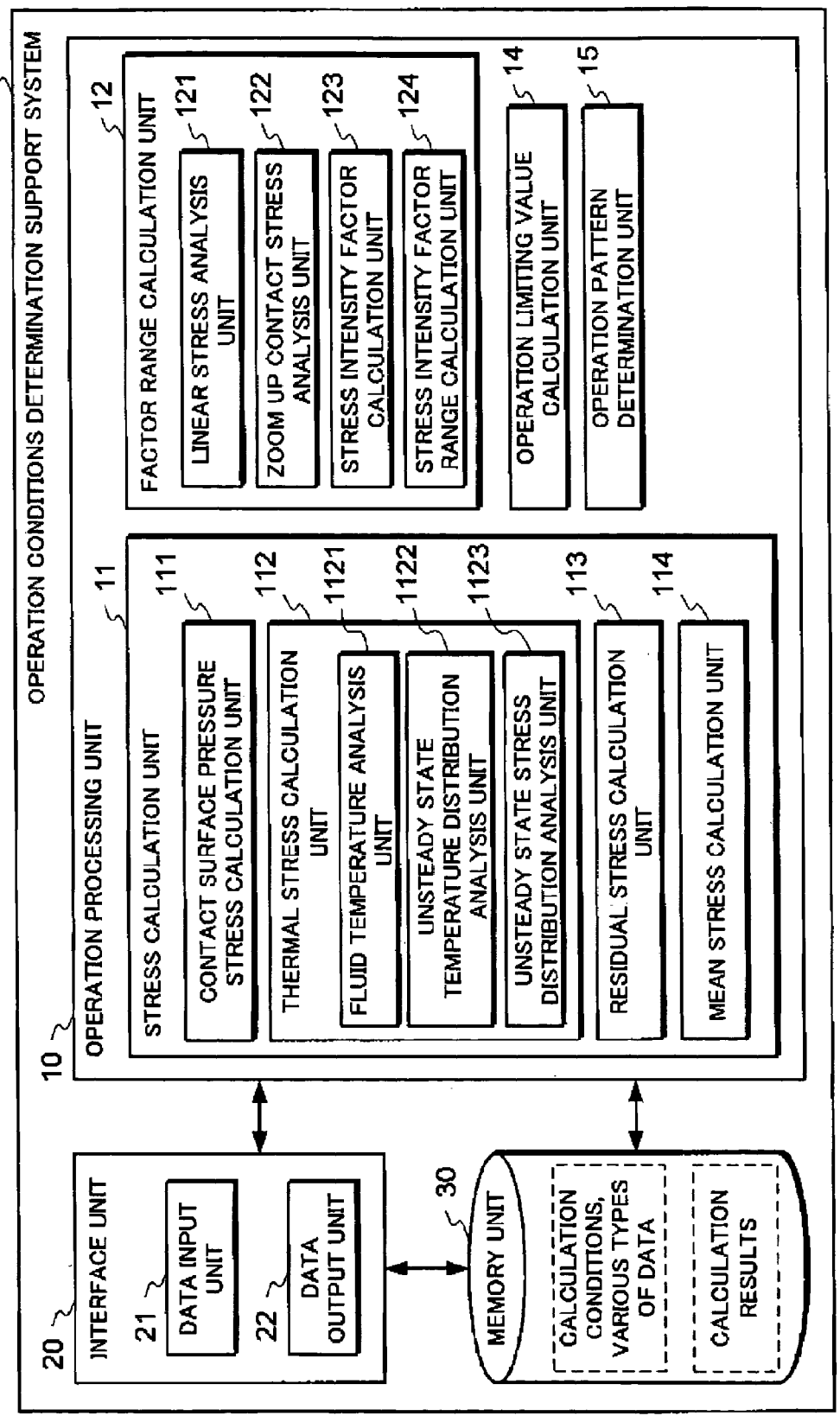
FIG. 7 is a block diagram of a generator rotor operation conditions determination support system according to a second embodiment that applies the present invention.

FIG. 7 is a block diagram of a generator rotor operating conditions determination support system according to a second embodiment that applies the present invention. The operating conditions determination support system 2 shown in FIG. 7 is a system that determines the operating pattern so that a crack does not extend, in accordance with the size of crack that has been generated in the shaft dovetail. For this purpose, instead of the crack propagation amount calculation unit 13 of the operation processing unit 10 of the crack propagation prediction system 1 according to the first embodiment, an operation limiting value calculation unit 14 and an operation pattern determination unit 15 are provided.

In the present embodiment, the factor range calculation unit 12 calculates the stress intensity factor range for a crack in the shaft dovetail, based on the size, position, and shape of a crack in the shaft dovetail. The operation limiting value calculation unit 14 is the part that calculates the mean stress at which the crack does not extend as an operation limiting value that determines the operating conditions. The mean stress is calculated corresponding to the obtained stress intensity factor range, based on data for the lower bound stress intensity factor range for the material. Also, the operation pattern determination unit 15 is the part that determines the operation pattern so that the crack does not extend, based on obtained operation limiting values, using mean stress data obtained from various types of operation pattern. The configuration of the other parts is the same as the first embodiment.

[Operation]

Figure 8:
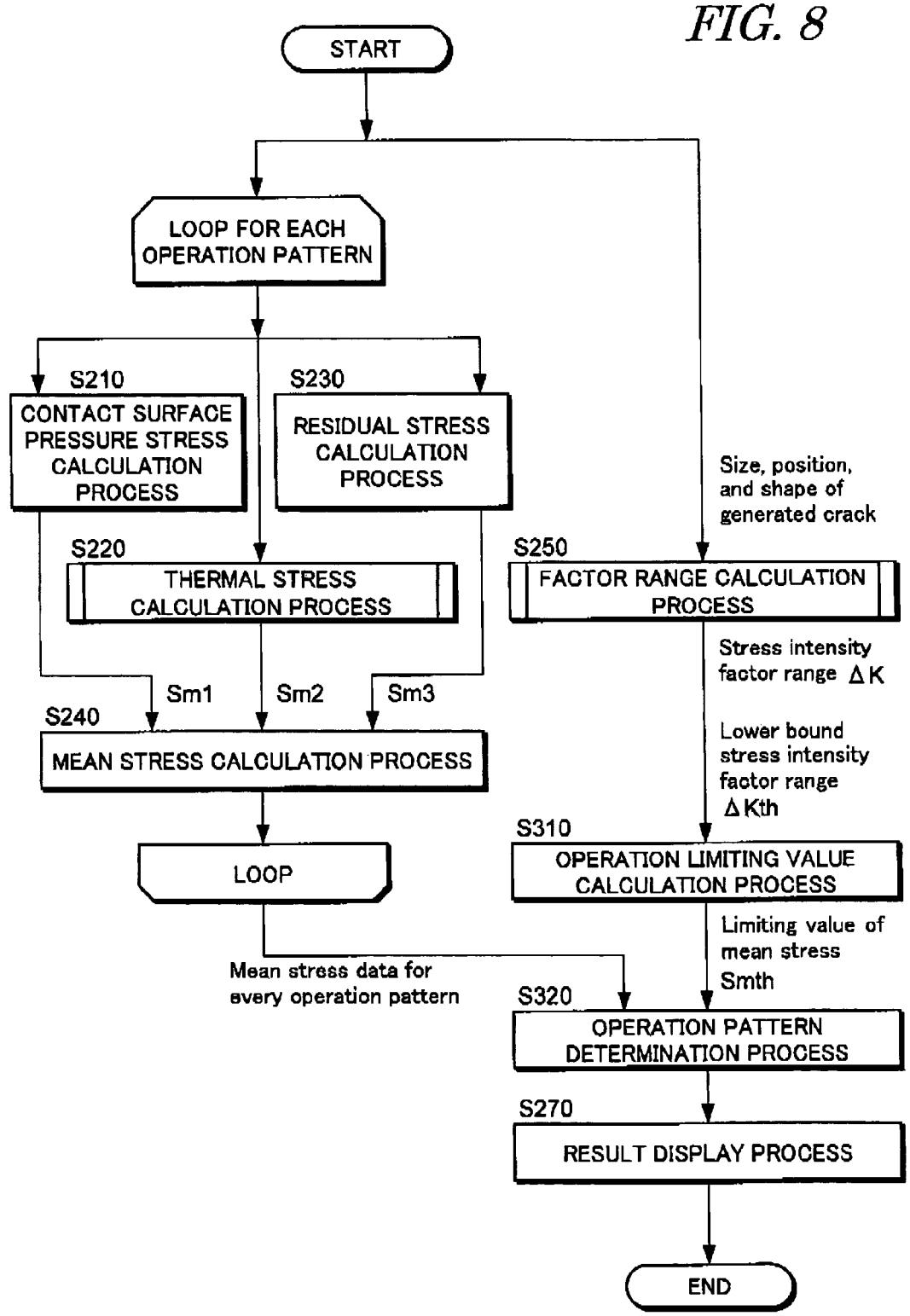
FIG. 8 is a flowchart showing the operation outline of the operation conditions determination support system according to the second embodiment.

FIG. 8 is a flowchart showing the operation outline of the operation conditions determination support system 2 according to the second embodiment as described above.

In FIG. 8, processes shown with the same reference marks as in FIG. 2 are basically the same process as the processes shown in FIG. 2. In other words, as a loop process (LOOP), the operating conditions determination support system 2 obtains the mean stress data for every operation pattern by carrying out the contact surface pressure stress calculation process (S210), the thermal stress calculation process (S220), the residual stress calculation process (S230), and the mean stress calculation process (S240) by the stress calculation unit 11 for each operation pattern.

On the other hand, the operation conditions determination support system 2 carries out the factor range calculation process (S250) by the factor range calculation unit 12, corresponding to the size, position, and shape of a crack that has been generated, calculates the stress intensity factor range $\Delta K$, and stores the stress intensity factor range $\Delta K$ in the memory unit 30. In this case, when the crack size, position, and shape information has been determined, the stress intensity factor range $\Delta K$ at the crack tip can be calculated in the same way as the factor range calculation process that was explained in the first embodiment.

Next, as an operation limiting value calculation process (S310) by the operation limiting value calculation unit 14, the operation conditions determination support system 2 calculates the mean stress at which the crack does not extend. The mean stress at which the crack does not extend corresponds to the stress intensity factor range $\Delta K$ obtained in the factor range calculation process (S250), based on data for the lower bound stress intensity factor range $\Delta K th$ for the material. The calculated mean stress is an operation limiting value for determining the operation conditions, and is stored in the memory unit 30. Here, the data for the lower bound stress intensity factor range $\Delta K th$ for the material is data such as that shown in FIG. 3, that is either stored in advance in the memory unit 30 or provided by inputting from the interface unit 20.

In this case, as shown in FIG. 3, in the data for crack propagation of a material, the lower bound stress intensity factor range $\Delta K th$ for which the crack does not extend is affected by the mean stress. Therefore it is possible to determine in reverse the mean stress Smth at which the crack does not extend, from the obtained stress intensity factor range $\Delta K$ and the lower bound stress intensity factor range $\Delta K th$ for the material. Also, during operation the mean stress is a function of time due to the effect of surface pressure and thermal stresses.

Finally, the operation conditions determination support system 2 determines the operation condition under which the crack does not extend, as an operation pattern determination process (S320) by the operation pattern determination unit 15, based on the operation limiting value obtained, and using mean stress data for each operation pattern. In other words, by using mean stress data for each operation pattern, if the mean stress limiting value Smth is determined, it is possible to determine the operation pattern at which the crack does not extend. The determined operation pattern is stored in the memory unit 30 as calculation results. The operation conditions determination support system 2 also carries out a result display process (S270) that displays the determined operation pattern by the data display unit 22 of the interface unit 20.

Figure 9:
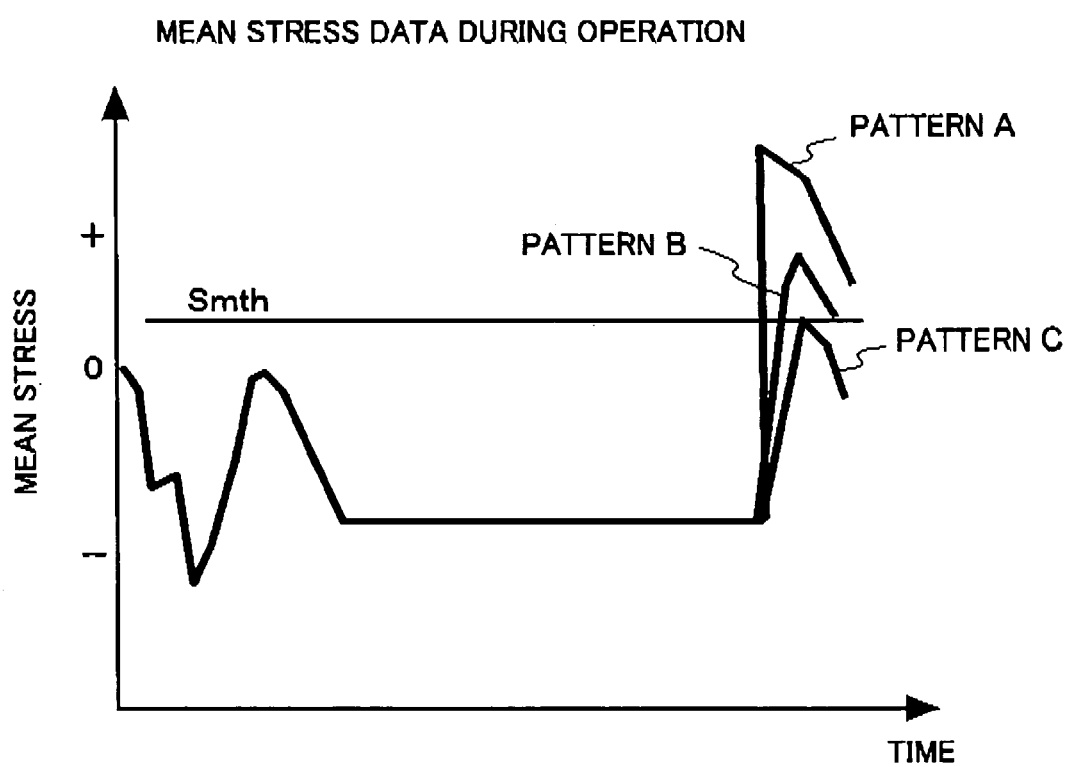
FIG. 9 is a graph that schematically shows the change in mean stress for the cases where the pattern when the generator rotor is stopped is changed.

FIG. 9 is a graph that schematically shows the change in mean stress for cases where the pattern when the generator rotor is stopped is changed. Here, pattern B is the normally used stopping pattern, pattern A is a stopping pattern in which stopping is carried out faster than normal, and pattern C is a stopping pattern in which stopping is carried out slower than normal. It can be seen that by stopping slowly as in pattern C, the thermal stresses become smaller, and it may be possible to reduce the mean stress during operation to the mean stress Smth at which the crack does not extend.

In particular, as is clear from FIG. 6, when stopping a generator rotor the thermal stresses generated in the generator rotor contribute to increasing the mean stress. Therefore, by changing to a slower stopping pattern it is possible to suppress the shaft dovetail crack propagation until the next periodic inspection.

[Effect]

According to the second embodiment as described above, it is possible to determine operation conditions at which crack propagation does not occur. Therefore it is possible to provide a generator rotor operation conditions determination support system, method, and program capable of controlling crack propagation.

Also, as a specific application of the operation conditions determination support system according to the second embodiment, by determining the operation pattern in which a shaft dovetail crack that is discovered during periodic inspection or similar does not extend until the next periodic inspection, and limiting the operation of the generator rotor, it is possible to operate the generator rotor without immediately chipping and removing the discovered crack, so maintainability can be improved.

Third Embodiment

[Configuration]

Figure 10:
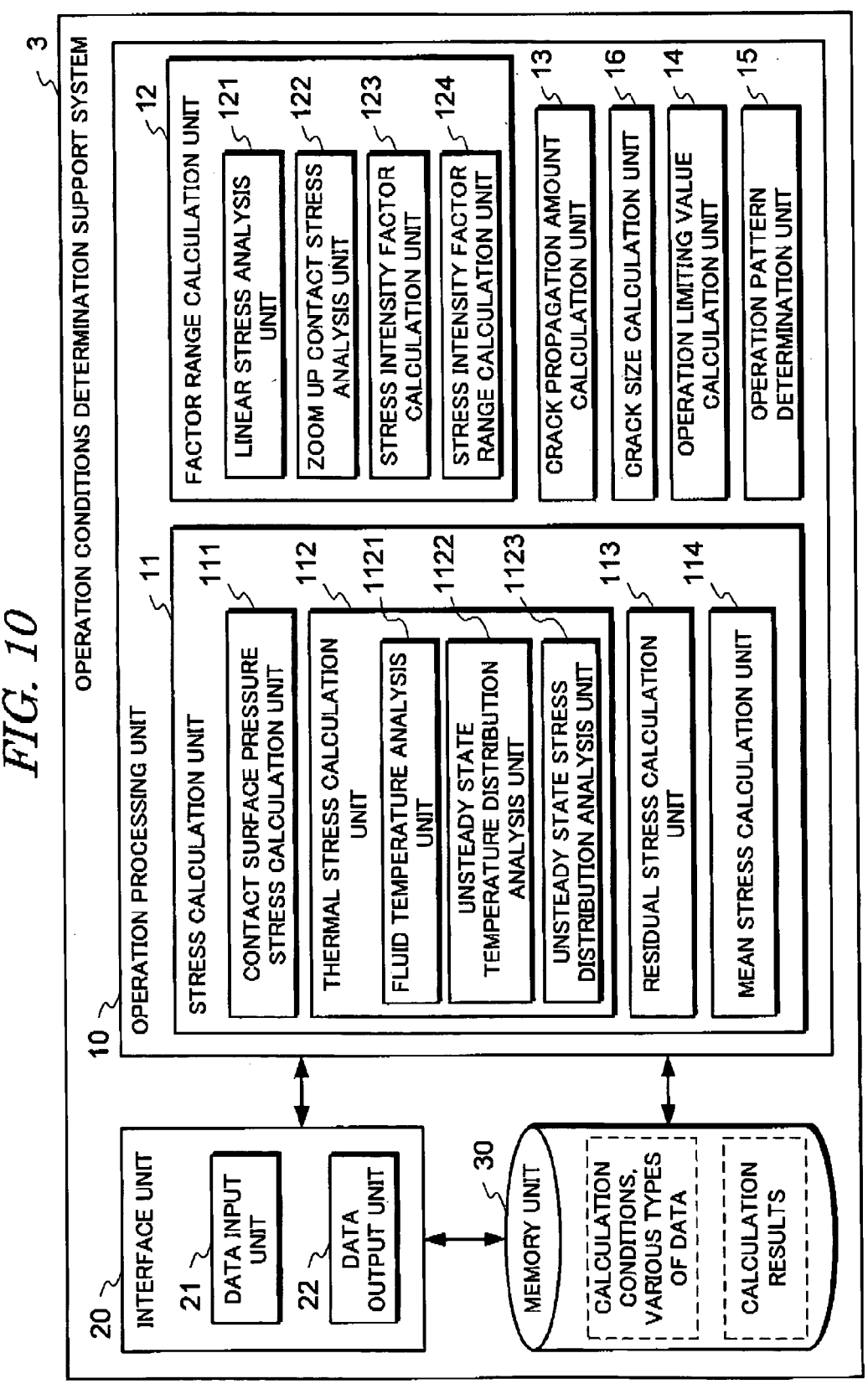
FIG. 10 is a block diagram of a generator rotor operation conditions determination support system according to a third embodiment that applies the present invention.

FIG. 10 is a block diagram of a generator rotor operation conditions determination support system according to a third embodiment that applies the present invention. When the generator rotor is operated in accordance with an operation pattern so that a crack does not extend, by the same method as the operation conditions determination support system 2 according to the second embodiment, and if it becomes necessary for some reason to exceed the operation limiting value in the operation, the operation conditions determination support system 3 shown in FIG. 10 calculates a new operation limiting value corresponding to the crack propagation and changes the operation pattern accordingly. Therefore, the present embodiment is provided with the operation processing unit 10 of the crack propagation prediction system 1 according to the first embodiment, to which is added a crack size calculation unit 16, and the operation limiting value calculation unit 14 and the operation pattern determination unit 15 which are the same as the second embodiment.

In the present embodiment, the factor range calculation unit 12 calculates the stress intensity factor range for a crack that has been generated in the shaft dovetail, based on size, position, and shape of the crack that has been generated in the shaft dovetail, the same as the factor range calculation unit 12 according to the second embodiment. Also, the crack propagation amount calculation unit 13 calculates the crack propagation amount during operation, from the obtained stress intensity factor range and mean stress, and material crack propagation data.

Also, the crack size calculation unit 16 is the part that calculates in detail the current crack size, using the obtained crack propagation amount. Furthermore, the operation limiting value calculation unit 14 calculates the operation limit value to determine the new operation conditions using the obtained crack size. Also, the operation pattern determination unit 15 determines the operation pattern so that the crack does not extend, based on the operation limiting value, the same as the operation pattern determination unit 15 according to the second embodiment. The configurations of the other parts are the same as those of the first and second embodiments.

[Operation]

Figure 11:
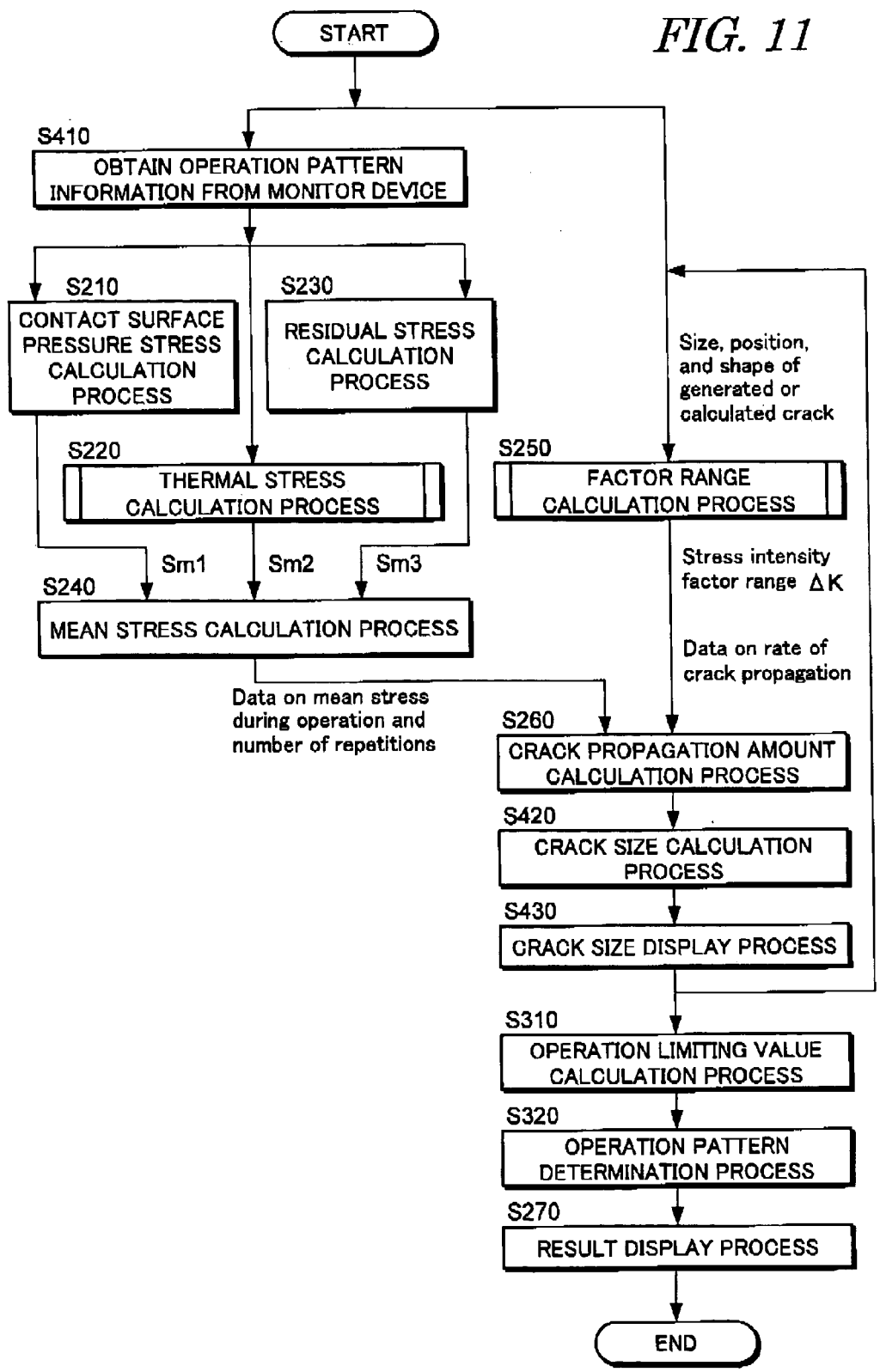
FIG. 11 is a flowchart showing the operation outline of the operation conditions determination support system according to the third embodiment.

FIG. 11 is a flowchart showing the operation outline of the operation conditions determination support system 3 according to the third embodiment as described above.

In FIG. 11, processes shown with the same reference marks as those in FIGS. 2 and 8 are basically the same processes as the processes shown in FIGS. 2 and 8. In other words, the operation conditions determination support system 3 obtains detailed information on the operation pattern from a monitor device that is commonly provided in power generation plant (S410), obtains data on the mean stress and number of repetitions during operation by carrying out the contact surface pressure stress calculation process (S210), the thermal stress calculation process (S220), the residual stress calculation process (S230), and the mean stress calculation process (S240) by the stress calculation unit 11, and stores the mean stress and number of repetitions in the memory unit 30.

In other words, from a monitoring device that monitors the operation information of a power generation plant, detailed operation pattern information is obtained, and it is possible to calculate the mean stress due to the contact surface pressure and the mean stress due to the thermal stresses by the contact surface pressure stress calculation process (S210), the thermal stress calculation process (S220) in the same way as the first embodiment. Then by adding these mean stresses and the residual stress data calculated by the residual stress calculation process (S230), the mean stresses during operation and data on the number of repetitions of the repeated load at a particular mean stress can be obtained.

On the other hand, the operation conditions determination support system 3 carries out the factor range calculation process (S250) by the factor range calculation unit 12, corresponding to the size, position, and shape of the crack that has occurred in the shaft dovetail, the same as in the second embodiment, calculates the stress intensity factor range ΔK, and stores the stress intensity factor range ΔK in the memory unit 30.

Next, as the crack propagation amount calculation process (S260) by the crack propagation amount calculation unit 13, the operation conditions determination support system 3 calculates in detail the crack propagation amount, using the obtained stress intensity factor range ΔK, the mean stress, the number of repetitions, and the material data on crack propagation rates. Here, the material data on crack propagation rates is data such as that shown in FIG. 3, that is either stored in advance in the memory unit 30, or provided by inputting using the interface unit 20.

Next, as a crack size calculation process (S420) by the crack size calculation unit 16, the operation conditions determination support system 3 calculates in detail the current crack size, using the obtained crack propagation amount and stores the crack size in the memory unit 30. In other words, the current crack size is the original crack size to which the crack propagation amount is added. As a crack size display process (S430), the crack size calculation unit 16 constantly displays the calculated value of the crack size calculated in this way in the data output unit 22 of the interface unit 20, so that the crack information can be reflected in the operation. Furthermore, as shown in FIG. 11, the calculated crack size may be used in the same way as the size of an actually occurring crack to calculate a new crack size.

Next, the operation conditions determination support system 3 calculates the operation limiting value that determines the new operation conditions, by carrying out the operation limiting value calculation process (S310) by the operation limiting value calculation unit 14, using the obtained crack size, and stores the operation limiting value in the memory unit 30. Then, the operation pattern is determined so that the crack does not extend based on the obtained operation limiting value, same as in the second embodiment, as the operation pattern determination process (S320) by the operation pattern determination unit 15. The determined operation pattern is stored in the memory unit 30 as a calculation result. The operation conditions determination support system 3 also carries out the result display process (S270) to display the determined operation pattern using the data output unit 22 of the interface unit 20. In other words, it is possible to display the operation pattern corresponding to the newly calculated crack size using the same operation limiting value calculation method as the second embodiment.

[Effect]

According to the third embodiment as described above, the crack propagation is predicted in detail, based on a shaft dovetail crack discovered in periodic inspection or similar, so the operator can easily check the current crack length and the operation limit. Therefore, it is possible to continue operating a generator rotor while maintaining reliability, without chipping and removing a discovered crack.

Fourth Embodiment

Figure 12:
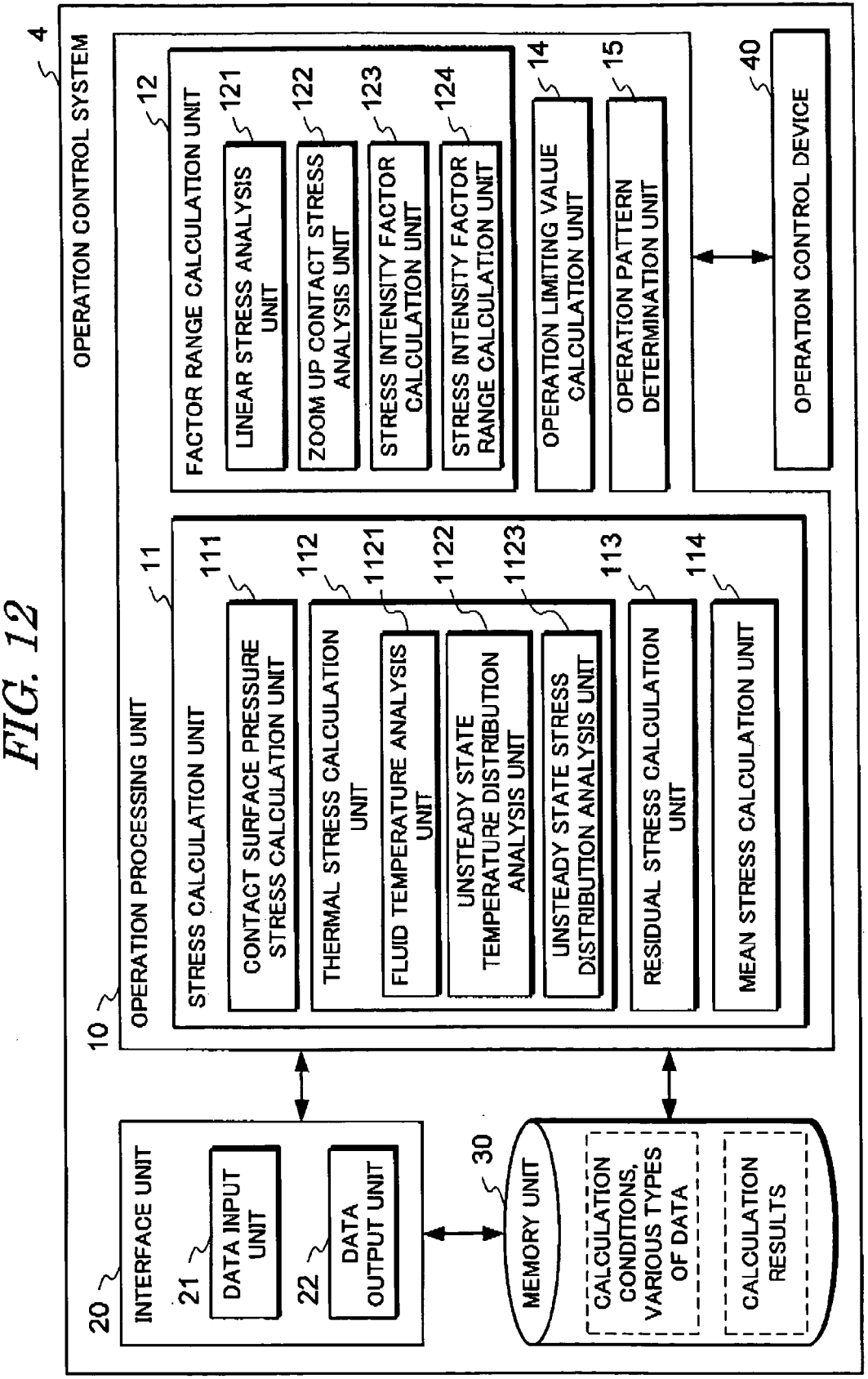
FIG. 12 is a block diagram of a generator rotor operation control system according to a fourth embodiment that applies the present invention.

FIG. 12 is a block diagram of a generator rotor operation control system according to a fourth embodiment that applies the present invention. The generator rotor operation control system 4 shown in FIG. 12 is the operation conditions determination support system 2 according to the second embodiment, to which an operation control device 40 that controls the operation of the generator rotor has been incorporated.

According to the fourth embodiment as described above, in addition to the effect of the second embodiment, as a result of the operation control device 40 the effect that operation of the generator rotor can be controlled based on the operation conditions so that crack propagation does not occur can be obtained.

Other Embodiments

The present invention is not limited to the embodiments described above, and many types of modified embodiments are possible within the scope of the present invention. First, the system configurations and the flowcharts shown in the drawings are just examples, and the details of specific configurations, operation procedures, and processes may be selected as appropriate. For example, in the fourth embodiment, operation control means is incorporated into the operation conditions determination support system according to the second embodiment. However, operation control means may also be incorporated into the operation conditions determination support system according to the third embodiment.

What is claimed is:

1. A generator rotor crack propagation prediction system, comprising:
    memory means;
    interface means that inputs data and outputs results;
    stress calculation means that calculates the mean stress in a generator rotor shaft dovetail and stores the stress in the memory means;
    factor range calculation means that calculates the stress intensity factor range of shaft dovetail crack and stores the stress intensity factor range in the memory means; and
    crack propagation amount calculation means that calculates an amount of the shaft dovetail crack propagation from the mean stress and stress intensity factor range stored in the memory means, and crack data.

2. The generator rotor crack propagation prediction system according to claim 1, wherein the stress calculation means adds the mean stress in the shaft dovetail due to contact surface pressure between the shaft dovetail and a wedge, the mean stress in the shaft dovetail due to shaft dovetail thermal stresses, and the mean stress in the shaft dovetail due to residual stresses to calculate the mean stress generated in the shaft dovetail.

3. The generator rotor crack propagation prediction system according to claim 1 or claim 2, wherein the crack propagation amount calculation means calculates the amount of the shaft dovetail crack propagation for an arbitrary period of time from the obtained mean stress and stress intensity factor range, an operation pattern, an operation time, and the crack data.

4. The generator rotor crack propagation prediction system according to claim 1, wherein the stress calculation means comprises as means for calculating the shaft dovetail thermal stress:
- means for carrying out fluid temperature analysis of a cooling medium near the generator rotor and a generator coil;
- means for carrying out unsteady temperature distribution analysis of the wedge and the rotor using heat transfer coefficients and temperature data of the cooling medium obtained from the fluid temperature analysis as temperature boundary conditions; and
- means for carrying out unsteady contact stress analysis of the rotor and wedge using the temperature distribution obtained from the unsteady state temperature distribution analysis.

5. The generator rotor crack propagation prediction system according to claim 1, wherein the factor range calculation means comprises:
- means for carrying out linear stress analysis of a whole generator rotor model;
- means for carrying out zoom up contact stress analysis of the shaft dovetail using deformation and stress data of part of the rotor obtained from the linear stress analysis; and
- means for calculating the stress intensity factor of the shaft dovetail crack using the stress distribution or the displacement distribution obtained from the zoom up contact stress analysis.

6. A generator rotor crack propagation prediction method for predicting generator rotor shaft dovetail crack propagation using operation processing means that carries out calculations to predict crack propagation, memory means that stores calculation results, and interface means that receives data input and outputs results, the method comprising the steps of:
- calculating the mean stress in the shaft dovetail using the calculation means;
- calculating the stress intensity factor range for a crack in the shaft dovetail;
- calculating and storing in the memory means an amount of the shaft dovetail crack propagation from the obtained mean stress and stress intensity factor range, and crack data; and
- displaying the obtained calculation result using the interface means.

7. A generator rotor crack propagation prediction program that predicts generator rotor shaft dovetail crack propagation using a computer, the program causing the computer to implement:
- a stress calculation function that calculates the mean stress generated in a shaft dovetail;
- a factor range calculating function that calculates the stress intensity factor range for a crack generated in a shaft dovetail; and
- a crack propagation amount calculation function that calculates an amount of the shaft dovetail crack propagation, from the obtained mean stress and stress intensity factor range, and crack data.

* * * * *